United States Patent [19]
Hutchins et al.

[11] Patent Number: 5,199,177
[45] Date of Patent: Apr. 6, 1993

[54] LEVEL

[75] Inventors: Walter J. Hutchins, West Hartford, Conn.; John H. Wilcox, Shaftsbury, Vt.; James M. Jackson, Dearborn Heights; John M. Clark, Ann Arbor, both of Mich.

[73] Assignee: Stanley Tools, a Division of The Stanley Works, New Britain, Conn.

[21] Appl. No.: 882,936

[22] Filed: May 14, 1992

[51] Int. Cl.⁵ ............................................. G01C 9/32
[52] U.S. Cl. ...................................... 33/348.2; 33/379
[58] Field of Search ....................... 33/348, 348.2, 379, 33/366

[56] References Cited

U.S. PATENT DOCUMENTS

| | | |
|---|---|---|
| 1,172,971 | 2/1916 | Frank, Sr. |
| 2,198,945 | 4/1940 | Morris ................................. 33/348.2 |
| 2,305,678 | 12/1942 | Cravaritis et al. |
| 2,367,858 | 1/1945 | Flynn |
| 2,695,949 | 11/1954 | Ashwill |
| 2,790,069 | 4/1957 | Alexander |
| 2,825,144 | 3/1958 | Warden, Sr. et al. |
| 2,944,144 | 7/1960 | Naylor ................................. 33/348 |
| 3,046,672 | 7/1962 | Lace |
| 3,172,212 | 3/1965 | Pappas |
| 3,442,024 | 5/1969 | Don |
| 3,584,212 | 6/1971 | Hansen |
| 3,738,015 | 6/1973 | De Jong |
| 3,835,549 | 9/1974 | De Jong et al. |
| 3,871,110 | 3/1975 | Gutowski et al. |
| 3,878,618 | 4/1975 | Freeman |
| 4,003,134 | 1/1977 | Adams |
| 4,208,803 | 6/1980 | Brown et al. |
| 4,392,184 | 7/1983 | Hearold et al. |
| 4,407,075 | 10/1983 | MacDermott ..................... 33/348.2 |
| 4,484,393 | 11/1984 | LaFreniere |
| 4,625,423 | 12/1986 | Sackett |
| 4,833,788 | 5/1989 | Munro |
| 4,876,798 | 10/1989 | Zimmerman ....................... 33/348.2 |
| 4,979,310 | 12/1990 | Wright |

*Primary Examiner*—Harry N. Haroian
*Attorney, Agent, or Firm*—Chilton, Alix & Van Kirk

[57] ABSTRACT

A lighted level including a frame having parallel working surfaces and an inner connecting web having an aperture with a pair of notches for supporting a liquid-containing vial. The level includes a light emitting diode for illuminating the vial. The level is constructed for automatic drop-in assembly of each of the component parts, including a printed circuit board containing the lighting circuitry, without requiring wires, screws, pins, pegs or bolts.

20 Claims, 3 Drawing Sheets

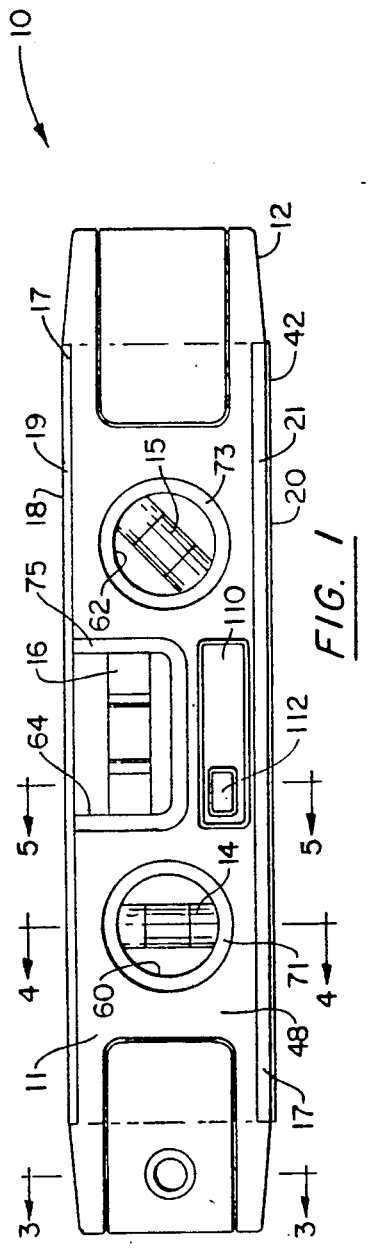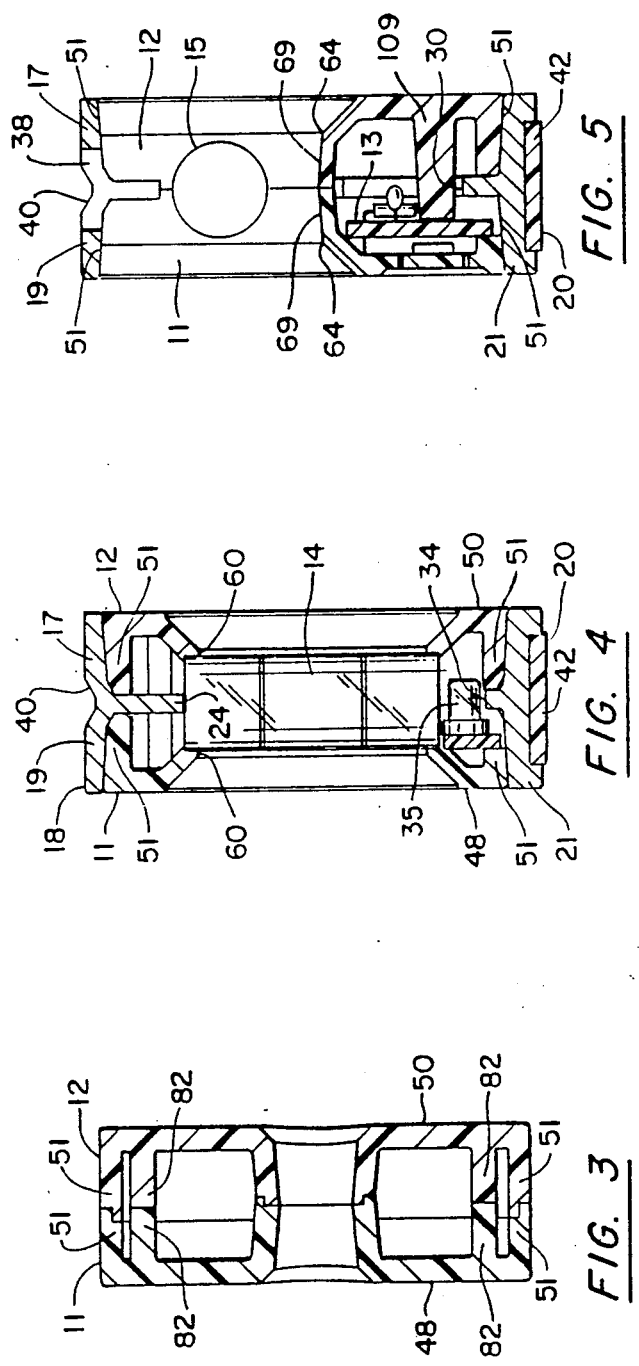

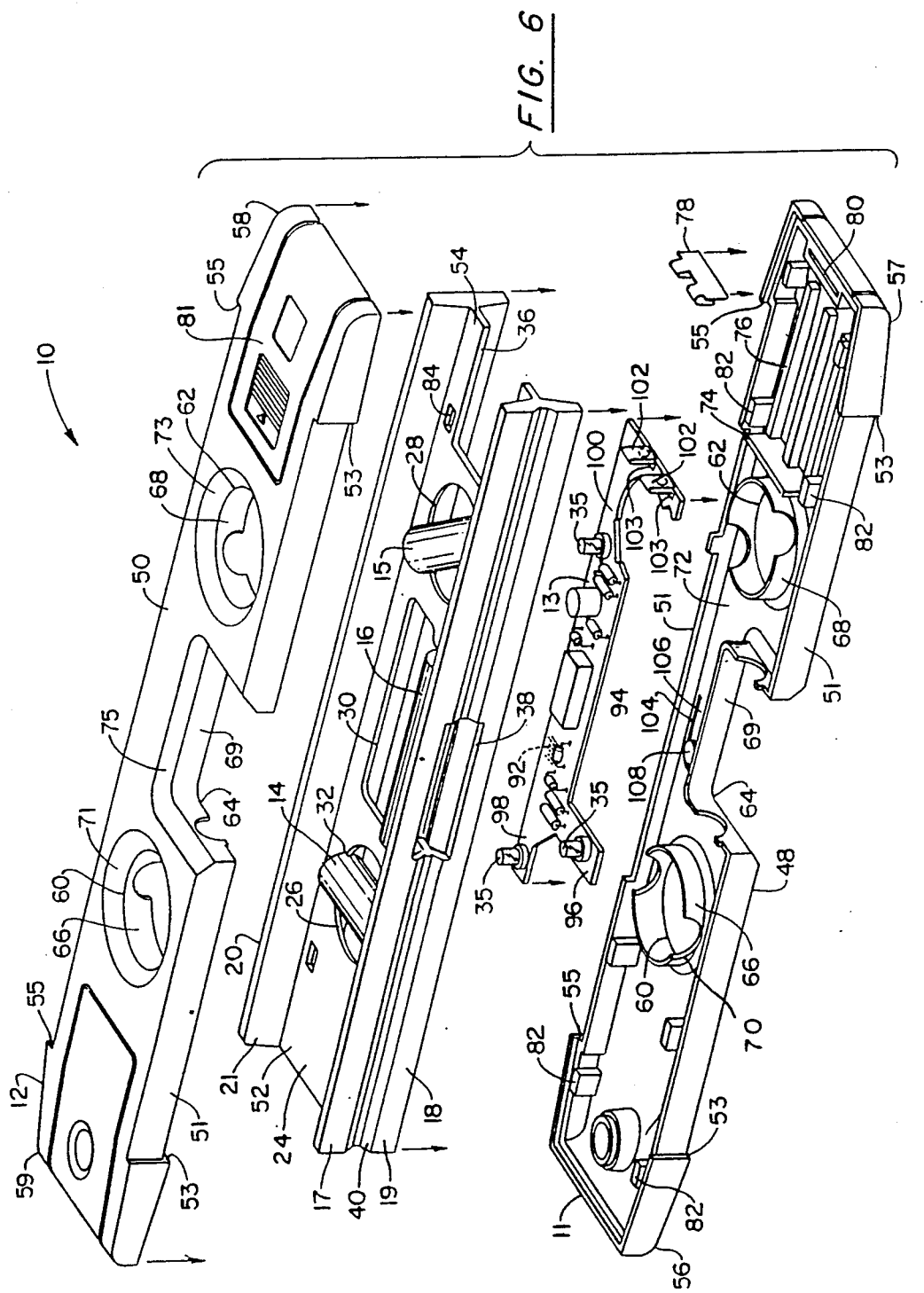

and plastic, are fitted

LEVEL

BACKGROUND OF THE INVENTION

The present invention relates generally to levels and more particularly relates to a level that can be illuminated for use in a dark or shady area.

Spirit levels having lights for illuminating the fluid-containing vials are disclosed, for example, in U.S. Pat. No. 3,166,855 issued Jan. 26, 1965 to Erritt. As described in Erritt, the light bulbs of the level are operated by a mercury switch disposed within the body of the level. A problem with such levels is that their manufacture and assembly is costly due to the manual work required in assembling the level, including soldering that is associated with the lighting circuitry.

SUMMARY OF THE INVENTION

An object of the invention is to provide a level that can be conveniently illuminated for use in a dark or shady area.

Another object of the invention is to provide a lighted level that can be produced by automatic drop-in assembly of the lighting hardware.

Yet another object of the invention is to provide a lighted level that can be manufactured economically, requiring a minimum number of component parts.

Other objects will be in part obvious and in part pointed out more in detail hereinafter.

The invention in a preferred form is a level that is adapted for automatic assembly. The level has a frame provided with parallel working surfaces and an interconnecting web. The web has an aperture providing a pair of oppositely directed notches for holding a liquid-containing vial. The vial is positioned with its ends precision fitted in the pair of notches at a preselected relationship relative to the working surfaces with the longitudinal axis of the vial generally parallel to the plane of the web. The level includes a cover formed from front and back side cover plates mounted on opposite sides of the web. At least one of the cover plates has an aperture for viewing the vial. The cover has a circuit board retaining portion for supporting a printed circuit board containing lighting circuitry for illuminating the vial. The vial is illuminated by a light source, preferably a light emitting diode (LED) which is disposed on the circuit board. A connector electrically connects the circuit board to a power source. Preferably, the power source is one or more batteries which are removably mounted in a battery retaining portion between the cover plates. The connector preferably is a wireless metal device that straddles the circuit board retaining portion and battery retaining portion of the level. More preferably, the connecting device includes a flange that is fastened to the printed circuit board and a U-shaped portion that is removably mounted on an interior mounting wall formed on one of the cover plates. When the connector is mounted on the mounting wall, one leg of the U-shaped portion of the clip is positioned to contact the terminals of the battery or batteries when they are placed within the battery retaining portion of the level. Preferably, the cover plates are ultrasonically welded to each other, sandwiching the frame and circuit board therebetween.

The invention accordingly consists in the features of construction, combination of elements and arrangement of parts which will be exemplified in the construction hereafter set forth and the scope of the application which will be indicated in the appended claims.

BRIEF DESCRIPTION OF THE DRAWINGS

FIG. 1 is a front side elevational view of a lighted level according to the invention;

FIG. 3 is an enlarged sectional view taken along line 3—3 of FIG. 1;

FIG. 4 is an enlarged sectional view taken along line 4—4 of FIG. 1;

FIG. 5 is an enlarged sectional view taken along line 5—5 of FIG. 1;

FIG. 6 is an exploded perspective view of the level shown in FIG. 1;

DESCRIPTION OF THE PREFERRED EMBODIMENT

Figure 2:
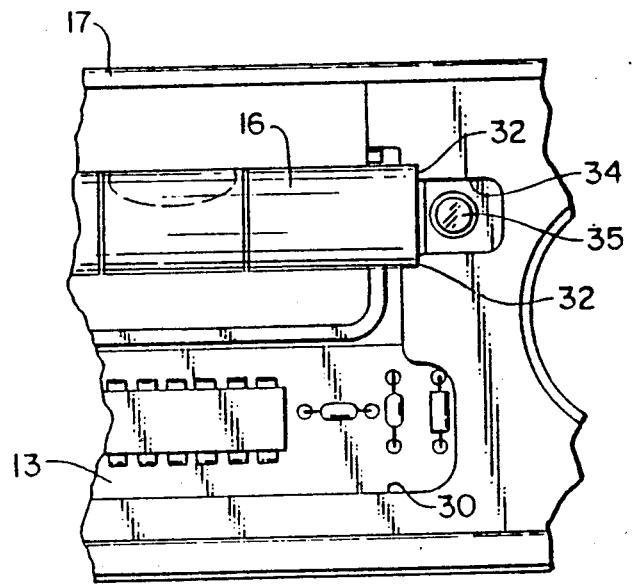
FIG. 2 is a partial back side elevational view of the level shown in FIG. 1, with the back cover plate removed.

Referring now to the drawings in detail wherein like numerals represent the same like parts throughout, and referring particularly to FIGS. 1 and 6, a level 10 according to the present invention is shown. The level 10, which can be assembled automatically, includes a front cover plate 11 having an inner side that is appropriately contoured to receive a circuit board 13. Three level vials 14, 15, 16 are mounted in an elongated frame 17 which is mounted over the circuit board 13 and front cover plate 11 in registry with the front cover plate 11. The level 10 is enclosed by a back cover plate 12, which is placed on the frame 17 and is friction welded or otherwise fastened to the front cover plate 11.

Referring to FIG. 6, the frame 17 has an I-shaped transverse section, and includes parallel upper and lower working surfaces 18, 20 provided by upper and lower flanges 19, 21, respectively, which are connected by an intermediate web 24. In the preferred embodiment, the frame 17 is made of metal so that it will not warp. A lightweight metal such as an available alloy of aluminum, magnesium or the like is preferred.

The web 24 is provided with one or more apertures to accommodate one or more level vials. Referring to FIG. 6, the preferred embodiment of the frame 17 has three apertures 26, 28, 30 to accommodate the three level vials 14, 15, 16, respectively, including two longitudinally spaced, generally circular apertures 26, 28, and a central rectangular aperture 30 positioned between the circular apertures 26, 28. Each aperture 26, 28, 30 has a pair of oppositely directed notches 32 for supporting the ends of an elongated level vial. Referring to FIGS. 2, 4 and 6, the notches 32 are generally of the type shown in commonly assigned U.S. Pat. No. 4,208,803, Brown et al., issued Jun. 24, 1980, the contents of which are incorporated herein by reference, except that in the present invention one of the notches in each aperture includes a recessed portion 34 as an extension thereof. The recessed portion 34 is adapted to receive a light emitting diode (LED) 35 at one end of the vial when the frame 17 is deposited over the circuit board during automatic assembly.

The level vials 14, 15, 16, which are of a conventional configuration and are made of glass or plastic, are fitted in the pairs of notches 32 at a preselected relationship relative to the working surfaces 18, 20 of the level. Each vial 14, 15, 16 is centered such that its longitudinal axis is generally parallel to the plane of the web. As illustrated in FIG. 1, the perpendicular vial 14 is oriented perpendicularly relative to the working surfaces 18, 20, the diagonal vial 15 is positioned such that its length is at an angle of 45° relative to the working surfaces 18, 20, and the centrally located vial 16 is positioned in a direction parallel to the working surfaces 18, 20.

Referring to FIG. 2, the central rectangular aperture 30 of the web 24 is substantially larger than the vial 30 and extends below the notches 32 to proximate the lower working surface 20 in order to accommodate portions of the circuit board 13 upon which the hardware projects outward when the frame is automatically placed adjacent the circuit board. The web 24 also includes a rectangular cut-out portion 36 at one of its longitudinal ends to accommodate a standard 9-volt battery (not shown) when the battery is placed inside the level 10.

The upper flange 19 of the level 10 has an elongated, rectangular opening 38 and the web 24 is cut away near this opening in order that the central vial 16 can be viewed from the top of the level 10. The upper working surface 18 of the flange 19 also has a 3-sided groove 40 extending along the length thereof to assist in proper placement of the level on a curved surface and to keep the level 10 from sliding off of a curved surface during use. The lower working surface 20 of the level 10 has a magnet 42 along its length to support the level 10 on a metal surface.

During automatic assembly of the level 10, the frame 17 of the level is sandwiched between and in registry with the front and back cover plates 11, 12, which are preferably made of plastic and are generally hollow. The front and back cover plates 11, 12 have peripheral front and back side walls 48, 50, respectively, which cover the web 24 on opposite sides and extend longitudinally beyond each longitudinal end 52, 54 of the frame 17. The cover plates 11, 12 taper inwardly at their longitudinal ends 56, 57 and 58, 59 to give the level a torpedo-like shape. The side walls 48, 50 terminate at the upper and lower sides of the level in shoulders 51 which extend inwardly along the inner side of the frame flanges 14, 16. At the ends 52, 54 of the frame 12 the shoulders 51 extend slightly outward in a transverse direction, forming upper and lower shoulder notches 53, 55, which assist in the alignment of the frame 17 on the front cover plate 11 during drop-in assembly of the level and alignment of the back cover plate 12 when it is placed over the frame 17. Longitudinally outward from the shoulder notches 53, 55, the shoulders 51 are tapered and define mating surfaces which lie in a single longitudinal parting plane traversing the longitudinal center line of the level 10.

Referring to FIG. 6, the cover plates 11, 12 have round apertures 60, 62 that are aligned with the generally circular apertures 26, 28, respectively, in the frame 12. Furthermore, each of the cover plates 11, 12 has a rectangular indentation 64 aligned with the notched portion of the rectangular aperture that supports the central vial 16. Apertures 60, 62 and indentation 64, which permit the vials 14, 15, 16 to be viewed from either side of the level 10, are defined by mating pairs of ribs 66, 68, 69 on the cover plates. The exposed surfaces of the ribs, as well as exposed, tapered rims 71, 73, 75 connecting the ribs 66, 68, 69 to the cover plates 11, 12, are painted white in order to reflect light emitted from the LEDs, thereby minimizing the brightness of the LEDs that is required in order to clearly see the vials. Each of the ribs 66, 68, 69 has a pair of semi-circular recesses 70 for surrounding the ends of the vials on opposite sides relative to the longitudinal axes of the vials. The semicircular recesses 70 assist in precisely aligning the vials during drop-in assembly of the level 10.

The front cover plate 11 has an elongated circuit board receiving portion 72 located primarily below the central vial 16 and around the ribs 66, 68, 69. One end of the circuit board receiving portion 72 is defined by an interior mounting wall 74 formed on the front cover plate 11. The mounting wall 74 preferably, although not necessarily, extends across the parting plane of the cover plates and has a length perpendicular to the length of the working surfaces 18, 20. The mounting wall 74 also defines one end of a battery retaining portion 76 formed in between the cover plates, which is further defined at its opposite end by a metal cantilever spring 78 mounted in a slot 80 in the front cover plate 11. The back cover plate 12 has a slidably removable battery cover 81 that allows access to the battery retaining portion 76 of the level 10.

Referring to FIGS. 3 and 6, each of the cover plates 11, 12 has a plurality of small projections 82 integrally formed on the inner surface of the side wall. The projections 82 on each cover plate extend to the longitudinal parting plane of the level defined by the cover plates 44, 46 and are aligned with projections 82 on the other cover plate in a one-to-one relationship. Upon assembly of the level 10, the oppositely aligned projections 82 are ultrasonically welded to each other. The frame 17 has four small apertures 84 having a size generally identical to the size of the projections 82. The small apertures are positioned to allow passage of the cover plate projections 82 therethrough. When the level 10 is assembled, the four pairs of projections 82 meet midway in the small apertures 84. It is noted that the cover plates can be attached to each other, or can each be attached to the frame 17, by other automatic attachment means.

The printed circuit board 13, which provides the circuitry for illuminating the vials, is disposed in the circuit board receiving portion 72 of the front cover plate 11. The circuit board 13 is a rigid glass-epoxy board which offers structural support for three LEDs 35, which are mounted directly on the board, and for an on/off switch 92, which is integrated into the board. When the level is assembled automatically, each of the LEDs 35 is positioned to illuminate one of the vials from near the end of the vial. The circuit board 13 is shaped to fit around the cover plate apertures 60, 62 and indentation 64. In the preferred embodiment, most of the circuitry is located on the rectangular main portion 94 of the circuit board 13, which is below the central vial 16. The main portion 94 also supports the LED 35 which is positioned to illuminate the diagonal vial 15. The circuit board 13 has three narrow extension portions 96, 98, 100 which extend outward in various directions from the main portion 94. The first extension portion 96, located between the rectangular indentation 64 and the perpendicular vial 14, has an LED for illuminating the central vial 16. The second extension portion 98, which is located between the shoulder 51 proximate the lower working surface 20 and the perpendicular vial 14, has an LED for illuminating the perpendicular vial 14. The third extension portion 100, which fits around the perimeter of about 60% of the rib 68 surrounding the diagonal vial 28, supports a pair of metal U-shaped connecting devices 102. The connecting devices 102 include flanges 103 electrically connected to the edge of the circuit board 13. The flanges 103 are automatically soldered to the circuit board 13 during manufacture of the circuit board. The U-shaped portion of the connecting devices 102 is positioned to be removably mounted over the mounting wall 74 on the front cover plate 11 during drop-in assembly of the level. When the connecting devices 102 straddle the wall 74, they electrically connect the circuitry of the printed circuit board 13 to a battery (not shown) when the battery is placed in the battery receiving portion of the level, with its terminals in contact with the connecting devices 102. Optionally, a small projection (not shown), integrally formed on the inner surface of the back cover plate 12, extends across the parting plane of the cover plates through a small opening (not shown) in the web 24 below the aperture 28 and bears against the circuit board 13 near the connecting devices 102 to hold the circuit board in place.

The circuit board 13 is designed for two modes of operation, i.e., a toggle mode and an automatic timed mode. The toggle mode provides for on/off control of the LEDs by the user. The automatic timed mode will automatically turn off the LEDs after a predetermined amount of time. The automatic time mode is included in order to prevent the battery from wearing out when the level lights are accidentally left on, or the on/off switch 92 is accidentally pressed to turn on the LEDs 35 during transport of the level. In the preferred embodiment, the circuitry is designed to switch all three of the LEDs on or off simultaneously. The toggle mode of operation will alternately turn the LEDs 35 on and off with each successive press of the on/off switch 92. After the LEDs 35 are turned on and the switch 92 is released, the automatic timed mode will turn the LEDs 35 off after a predetermined period of time, e.g., 20 or 30 seconds. The LEDs 35 will remain on as long as the switch 92 is continuously pressed. In this manner, the automatic shutoff feature of the LEDs can be overridden. The circuitry required for the operation of the preferred embodiment of the level 10 in the manner described above is believed to be readily ascertainable by one having skill in the art.

According to the preferred embodiment of the invention, a 9-volt rectangular battery is used, as this provides for low cost performance and a simple connector interface.

In the embodiment of the level shown in FIGS. 1-6, the on/off switch 92 in the circuit board 13 is activated through a flexible area on the front cover plate 11 within the circuit board receiving portion 72. As shown in FIG. 6, the flexible switch activation area preferably is formed by a sideways U-shaped slit 104 which is cut in the side wall of the front cover plate 11 to form a slightly movable, but generally rigid flap 106 that is attached to the cover plate 11 along only one side. The flap 106 is adapted to move slightly inward when it is pressed from the outer face of the front cover plate side wall 48. Referring to FIGS. 5 and 6, an electrically conductive contact 108 is fastened to the inner side of the flap 106 within the curved portion of the U-shaped slit 104. When the flap 106 is pushed inward, the contact 108 touches an electrically conductive portion of the circuit board 13, thereby turning the LEDs on or off. A backup 109, shown in FIG. 5, is formed integrally on the inner surface of the back cover plate 12 and projects across the parting plane of the cover plates 11, 12 to contact the back of the circuit board 13 opposite the contact 108.

Referring to FIG. 1, on the outer side wall 48 of the front cover plate 11, a flexible and continuous segment of material, preferably plastic, is placed over the U-shaped slit to form a cover 110. The cover 110 includes on/off switch marker 112, which is placed directly over the contact 108. When the switch marker 112 is pressed by the user, the contact 108 is pressed against the circuit board 13 in order to activate or deactivate the illumination feature of the level 10.

Figure 7:
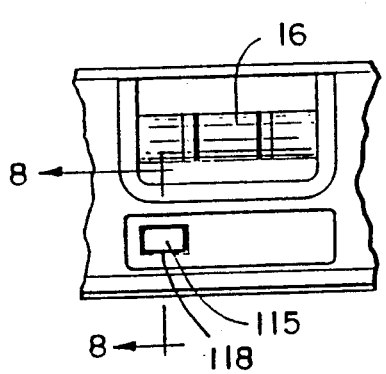
FIG. 7 is partial front side elevational view of a lighted level showing a second embodiment of a button-operated light switch according to the invention.
Figure 8:
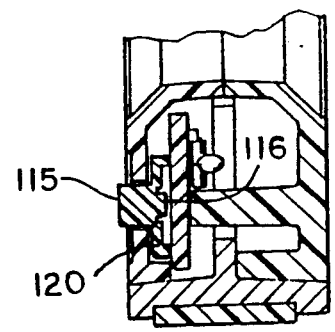
FIG. 8 is an enlarged sectional view taken along line 8—8 of FIG. 7.

In an alternative embodiment of the lighted level, the on-off switch 92 is activated by a single rubber button 115 which is sandwiched between the front cover plate 11 and the circuit board 13. The center portion of the button 115 extends through an opening 118 in the front cover plate 11. The button 115, which is shown in FIGS. 7 and 8, has a conductive pad 116 printed on its inner face. The conductive pad 116 contacts the switch 92 when the button 115 is pressed. An on-off logo (not shown) preferably is printed on or adhered to the outer face of the button. The button 115 has a pair of flexible, resilient extensions 120 which extend outward to the side of its inner face. The extensions 120 bear against the printed circuit board to keep the conductive pad spaced slightly from the switch 92 when the button 115 is not pushed, and to allow the conductive pad to touch the switch 92 when the button 115 is pushed.

While the components of the level can be assembled automatically in a variety of ways, the level 10 illustrated in FIGS. 1-6 preferably is assembled in the following manner. The contact 108 is fastened to the inner side of the front cover plate within the U-shaped slit 104, and the cover 110 is fastened to the outer side of the front cover plate 11. After the circuit board has been produced, with the flanges 103 of the U-shaped connecting devices 102 soldered thereto, the board 13 is deposited on the inner surface of the front cover plate 11 U-shaped portion of the connecting devices 102 fastened around the mounting wall 74. The metal cantilever spring 78 is placed in the slot 80 opposite to the metal connecting devices 102. The liquid-containing vials 14, 15, 16 are mounted in the notches 32 of the frame 17 and the frame is placed over the printed circuit board 13, with the apertures 26, 28, 30 of the frame aligned with the apertures 60, 62 and indentation 64, respectively, in the front cover plate 11. The back cover plate 12 is then placed over the frame and the two cover plates are ultrasonically welded together. The equipment that is designed for assembly of the embodiment of the level shown in FIGS. 1-6 can be easily modified to assemble levels having similar construction but which are not lighted.

The embodiment of the level having button 115 which activates the switch 92, illustrated in FIGS. 7 and 8, is assembled in generally the same manner as the embodiment shown in FIGS. 1-6, with several exceptions. In the second embodiment, the opening 118 is formed in the front cover plate before assembly, and the button 115, which has the contact pad 116 mounted on its inner face and an on/off label mounted on its outer face is placed in the opening from the inner side of the front cover plate before the circuit board is mounted on the inner surface of the front cover plate 11. As a result of the use of the button 115 with contact pad 116, the U-shaped slit 104, contact 108 and cover 110 are not required.

In the preferred embodiments of the level, use of friction welding for connecting the cover plates to each other and use of the metal connecting device 102 for mounting the circuit board in the circuit board receiving portion, allow for drop-in assembly of the lighting circuitry of the level 10 without requiring screws, pins, pegs or bolts. After the front and back cover plates have been fastened together, a battery can be inserted in the battery retaining portion 76 by slidably opening the battery cover 81 and then closing it over the battery.

As will be apparent to persons skilled in the art, various modifications and adaptation of the structure above described become readily apparent without departure from the spirit and scope of the invention, the scope of which is defined in the appended claims.

We claim:

1. A level, comprising,
   a frame provided with parallel working surfaces and an interconnecting web, the web having an aperture providing a pair of oppositely directed notches,
   an elongated vial positioned with its ends precision fitted in the pair of notches at a preselected relationship relative to the working surfaces with the longitudinal axis of the vial generally parallel to the plane of the web,
   a cover including first and second cover plates mounted on opposite sides of the web, at least one of the first and second cover plates having an aperture for viewing the vial, the cover having means defining a circuit board retaining portion and a battery retaining portion,
   a printed circuit board adapted to be automatically inserted in a stationary position in the circuit board receiving portion, the circuit board having a light emitting diode for illuminating the vial, and
   connecting means for forming an electrical connection between the circuit board and one or more batteries when the one or more batteries are mounted in the battery retaining portion, the connecting means being adapted to be automatically inserted during assembly of the level.

2. A level according to claim 1, wherein the means defining a battery retaining portion includes a mounting wall formed on one of the cover plates, and the connecting means includes a metal connecting device having a flange electrically connected to the circuit board and a U-shaped portion removably mounted around the mounting wall.

3. A level according to claim 2, wherein the U-shaped portion of the connecting device is adapted to directly contact terminals of the one or more batteries when the one or more batteries are mounted in the battery retaining portion.

4. A level according to claim 1, wherein the entire level is assembled without screws, pins, pegs or bolts.

5. A level according to claim 1, wherein the cover plates are connected to each other by friction welding.

6. A level according to claim 1, wherein one of the cover plates has a removable battery cover for accessing the battery retaining portion.

7. A level according to claim 1, wherein the cover plates extend beyond the ends of the frame.

8. A level according to claim 1, further comprising switch activation means on the cover for switching the light emitting diode on and off.

9. A level according to claim 8, wherein the switch activation means in a button which is sandwiched between the cover and the circuit board and extends through an opening in the cover.

10. A level according to claim 1, wherein the web further comprises aperture means providing two additional pairs of oppositely directed notches, two additional vials having their ends precision-fitted between the oppositely directed notches, and two light emitting diodes disposed on the circuit board for illuminating the additional vials.

11. A level according to claim 1, wherein the frame is metal.

12. A level according to claim 11, wherein the cover plates are plastic.

13. In a spirit level comprising a vial mounted in an aperture in an elongated vial support frame sandwiched between a pair of complementary cover plates having apertures for exposing the vial, the improvement wherein the level comprises illumination means for illuminating the vial, the illumination means including a light emitting diode fastened to a circuit board, the circuit board being automatically inserted between the cover plates during assembly of the level and being electrically connected to a battery when the battery is mounted in a battery retaining portion defined by at least one of the cover plates.

14. A method of automatically assembling a lighted level including a frame provided with parallel working surfaces and an interconnecting web having an aperture supporting a liquid-containing vial, and including first and second side cover plates, wherein the first side cover plate has a circuit board receiving portion, the method comprising:
   (a) depositing a printed circuit board within the circuit board receiving portion, wherein the circuit board has connecting means adapted to be connected to a power source and at least one light source for illuminating the vial,
   (b) mounting the frame in-registry with the first side cover plate and the circuit board such that the light source is positioned adjacent the vial for providing illumination of the vial, and
   (c) mounting the second side cover plate in registry with the frame.

15. A method according to claim 14, further comprising the step of:
   (d) after steps (a)–(c), friction welding the first and second side cover plates to each other.

16. A method according to claim 14, wherein the first side cover plate includes a battery receiving portion, and step (a) includes automatically positioning the connecting means such that it straddles the circuit board receiving portion and the battery retaining portion.

17. A method according to claim 16, wherein the connecting means is U-shaped, and step (a) includes mounting the connecting means on an interior mounting wall of the first cover plate separating the circuit board retaining portion and the battery retaining portion.

18. A method according to claim 14, wherein step (a) precedes step (b) and step (b) precedes step (c).

19. A method according to claim 14, wherein the level is assembled without screws, pins, pegs or bolts.

20. A method according to claim 14, wherein the first side cover plate has an opening within the circuit board receiving portion for receiving a button for activating the at least one light source, the method further comprising the step of:
   (d) before step (a), depositing a button for activating the at least one light source in the opening in the circuit board receiving portion.

* * * * *